(12) United States Patent
Chen

(10) Patent No.: US 7,466,457 B2
(45) Date of Patent: Dec. 16, 2008

(54) SHEET-FED SCANNER CAPABLE OF SCANNING MULTIPLE SCAN LINES FOR IMAGE SIGNAL CALIBRATION

(75) Inventor: Ku Ming Chen, Jhubei (TW)

(73) Assignee: Avision Inc. (TW)

( * ) Notice: Subject to any disclaimer, the term of this patent is extended or adjusted under 35 U.S.C. 154(b) by 260 days.

(21) Appl. No.: 11/414,450

(22) Filed: May 1, 2006

(65) Prior Publication Data
US 2006/0250665 A1  Nov. 9, 2006

(30) Foreign Application Priority Data
May 4, 2005  (TW) .............................. 94114343 A

(51) Int. Cl.
*H04N 1/04* (2006.01)
*H04N 1/40* (2006.01)

(52) U.S. Cl. ..................... 358/461; 358/496; 358/498; 358/406; 358/483; 358/408; 358/474

(58) Field of Classification Search ................. 358/461, 358/496, 498, 406, 504, 471, 474, 505, 482, 358/483; 399/367, 374; 355/23; 382/274
See application file for complete search history.

(56) References Cited

U.S. PATENT DOCUMENTS

| | | | | |
|---|---|---|---|---|
| 3,681,608 A | * | 8/1972 | Derderian et al. | 250/201.1 |
| 4,967,233 A | * | 10/1990 | Buchar et al. | 358/496 |
| 5,280,368 A | * | 1/1994 | Fullerton | 358/474 |
| 6,697,175 B1 | * | 2/2004 | Kumagai et al. | 358/497 |
| 6,840,642 B2 | * | 1/2005 | Ishikawa et al. | 359/872 |
| 6,989,915 B2 | * | 1/2006 | Honjo et al. | 358/461 |
| 7,057,746 B2 | * | 6/2006 | Binnig et al. | 358/1.12 |

\* cited by examiner

*Primary Examiner*—Cheukfan Lee

(57) ABSTRACT

A sheet-fed scanner capable of scanning multiple scan lines for image signal calibration includes a housing, a sheet-feeding mechanism, a first scanning module, a first actuator and a first calibration sheet. The sheet-feeding mechanism disposed in the housing feeds a document across a scan region. The first scanning module rotatably mounted in the housing scans a front side of the document fed across the scan region. The first calibration sheet is fixed in the housing and disposed in the scan region. The first actuator drives the first scanning module to rotate such that the first scanning module senses a plurality of scan lines on the first calibration sheet to obtain a first calibration standard for calibrating a first image signal of the front side of the document. Thus, it is possible to avert any flaws in image quality caused by the contaminated calibration sheet.

12 Claims, 3 Drawing Sheets

SHEET-FED SCANNER CAPABLE OF SCANNING MULTIPLE SCAN LINES FOR IMAGE SIGNAL CALIBRATION

BACKGROUND OF THE INVENTION

1. Field of the Invention

The invention relates to a sheet-fed scanner capable of scanning multiple scan lines for image signal calibration, and more particularly to a sheet-fed scanner capable of scanning multiple scan lines on a calibration sheet to obtain an image signal calibration standard.

2. Description of the Related Art

Before scanning a document, a typical scanner has to scan a calibration sheet with a standard color (e.g., standard white, standard black, or the like) to obtain a calibration standard for calibrating an image signal of the scanned document.

In a conventional sheet-fed scanner, a stationary scanning module scans a document fed by a sheet-feeding mechanism and also scans a stationary calibration sheet. Thus, after the scanning module scans the calibration sheet, the data corresponding to only one scan line is obtained to serve as the calibration standard for the subsequent scanning processes. When the calibration sheet is contaminated, the data corresponding to the single scan line may have great errors such that the subsequent scanning results are influenced significantly.

Thus, it is an important subject of the invention to provide a sheet-fed scanner capable of scanning multiple scan lines on a calibration sheet to obtain a calibration standard for calibrating an image signal without distorting the calibrated image.

SUMMARY OF THE INVENTION

It is therefore an object of the invention to provide a sheet-fed scanner capable of scanning multiple scan lines for image signal calibration, wherein a scanning module is slightly rotated to scan the multiple scan lines on a calibration sheet to obtain a calibration standard for calibrating an image signal.

To achieve the above-identified object, the invention provides a sheet-fed scanner capable of scanning multiple scan lines for image signal calibration. The scanner includes a housing, a sheet-feeding mechanism, a first scanning module, a first actuator and a first calibration sheet. The sheet-feeding mechanism disposed in the housing feeds a document across a scan region. The first scanning module rotatably mounted in the housing scans a front side of the document fed across the scan region. The first calibration sheet is fixed in the housing and disposed in the scan region. The first actuator drives the first scanning module to rotate such that the first scanning module senses a plurality of scan lines on the first calibration sheet to obtain a first calibration standard for calibrating a first image signal of the front side of the document. Thus, it is possible to avert any flaws in image quality caused by the contaminated calibration sheet.

In the above-mentioned sheet-fed scanner, it is possible to drive the scanning module to rotate according to the property of a cam, a piezoelectric material or a bimetal material, such that the multiple scan lines on the calibration sheet may be scanned to obtain a calibration standard for calibrating the image signal.

DETAILED DESCRIPTION OF THE INVENTION

The embodiments of the invention will be described with reference to the accompanying drawings.

Figure 1:
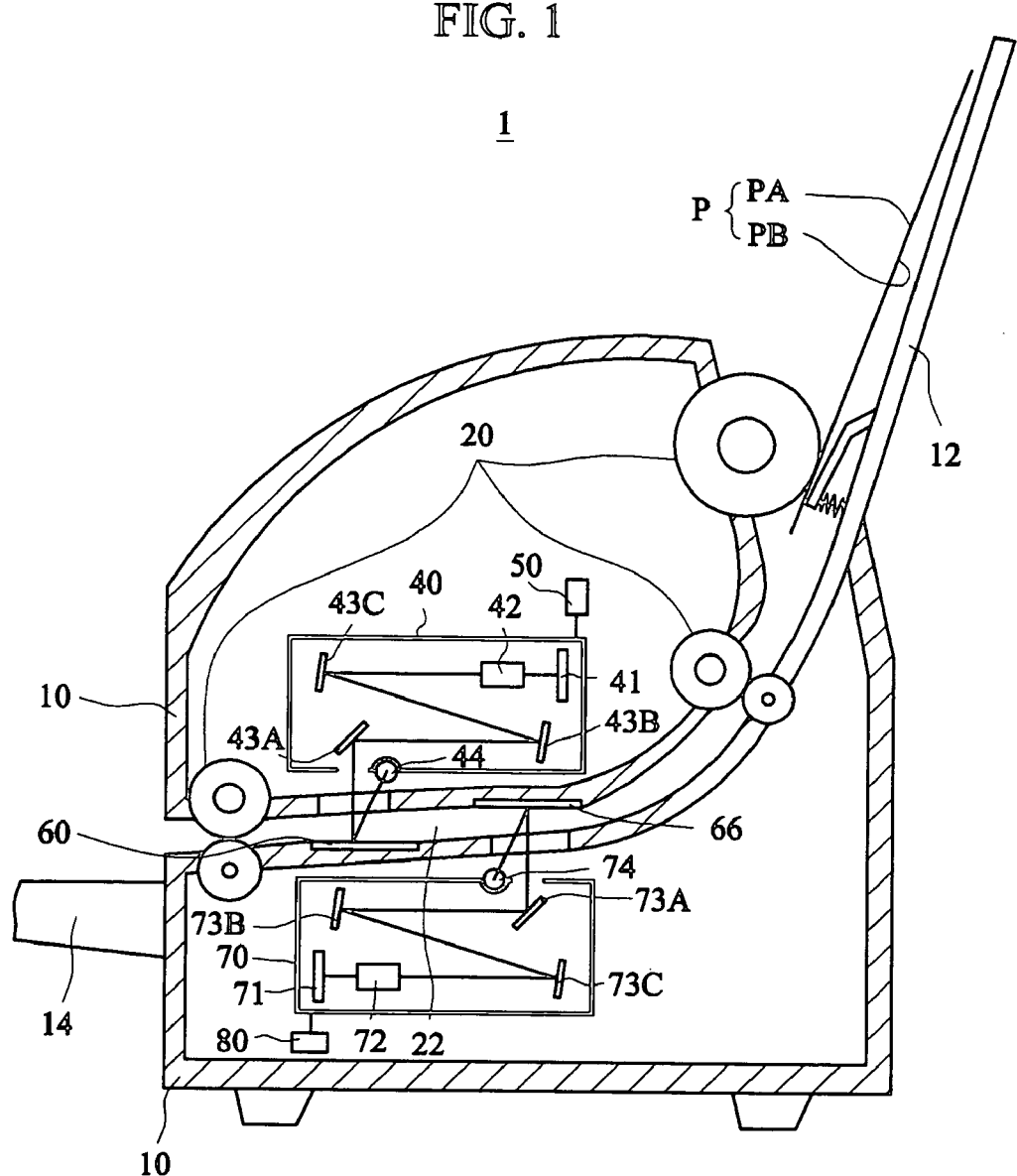
FIG. 1 shows a sheet-fed scanner according to a first embodiment of the invention.
Figure 2:
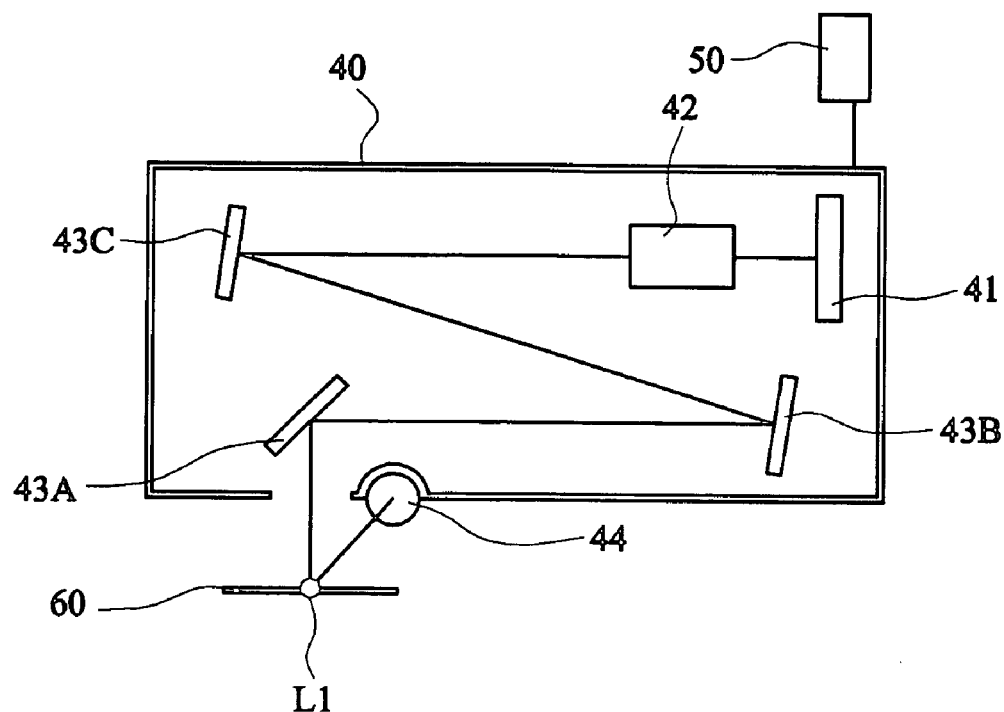
FIG. 2 shows a first state of a scanning module of FIG. 1.
Figure 3:
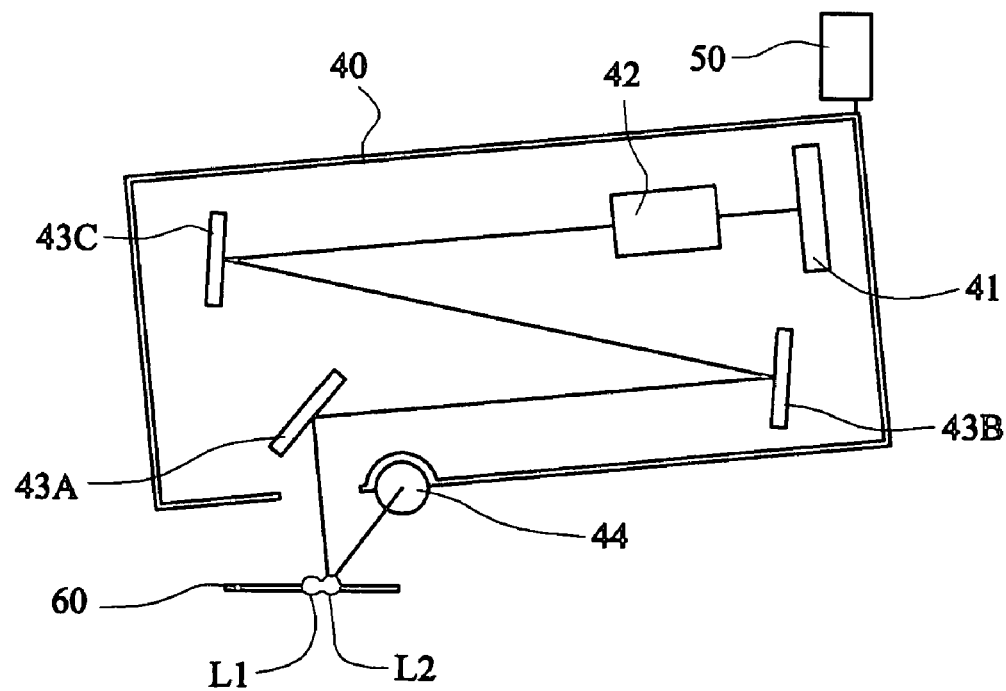
FIG. 3 shows a second state of the scanning module of FIG. 1.

FIG. 1 shows a sheet-fed scanner according to a first embodiment of the invention. FIGS. 2 and 3 show the first and second states of a scanning module of FIG. 1. As shown in FIGS. 1 to 3, the sheet-fed scanner 1 according to the invention is a duplex sheet-fed scanner capable of scanning a front side and a back side of a document. However, the concept of the invention may also be implemented in a simplex sheet-fed scanner, or an automatic document feeder integrated with a flatbed scanner.

The sheet-fed scanner 1 includes a housing 10, a sheet-feeding mechanism 20, a first scanning module 40, a first actuator 50 and a first calibration sheet 60. The housing 10 has a sheet input tray 12 for carrying one or more than one to-be-scanned document P, and a sheet output tray 14 for storing the document(s) P after being scanned. The sheet-feeding mechanism 20 feeds the document P across a scan region 22. The first scanning module 40 rotatably mounted in the housing 10 scans a front side PA of the document P fed across the scan region 22. The first scanning module 40 includes a first image sensor 41, a first lens 42, a plurality of first reflecting mirrors 43A to 43C, and a first light source 44 for illuminating the front side PA of the document P and the first calibration sheet 60.

The first actuator 50 drives the first scanning module 40 to rotate. The first actuator 50 may have various implementations. For example, the first actuator 50 may be composed of a power source (e.g., a motor) and a cam. Alternatively, the first actuator 50 may be made of a piezoelectric material, which deforms to drive the first scanning module 40 to rotate when a voltage is applied to the piezoelectric material. In addition, the first actuator 50 may be made of a bimetal material, which deforms to drive first scanning module 40 to rotate when a voltage is applied to the bimetal material to generate a current flowing through the first actuator 50.

The first calibration sheet 60 is fixed in the housing 10 and disposed in the scan region 22. Light rays coming from the first calibration sheet 60 are reflected, by the first reflecting mirrors 43A to 43C, to the first lens 42, which focuses the light rays on the first image sensor 41. The first actuator 50 drives the first scanning module 40 to rotate such that the first image sensor 41 of the first scanning module 40 senses a plurality of scan lines L1 and L2 on the first calibration sheet 60 to obtain a first calibration standard for calibrating a first image signal obtained after the first scanning module 40 subsequently senses the front side PA of the document P. In practice, the number of scan lines may be three or more than three, and the scanning data of all scan lines may be averaged to produce the above-mentioned calibration standard. Alternatively, some scanning data of the scan lines, which is quite different from the average, may be skipped, and the scanning data of the unskipped scan lines may be averaged again to obtain another average serving as the calibration standard.

In this embodiment, the first scanning module 40 may be rotated about an axis, which is parallel to an axial direction of the first light source 44, such as a lamp. So, the scan lines L1 and L2 are substantially in parallel to each other. It is to be noted that the rotation center of the first scanning module 40 of this embodiment may be located on the first reflecting mirror 43A or any other suitable position.

In addition, the duplex sheet-fed scanner 1 further includes a second scanning module 70, a second actuator 80 and a second calibration sheet 66, which are similar to the first scanning module 40, the first actuator 50 and the first calibration sheet 60 in the aspects of function and operation. The second scanning module 70, which is rotatably mounted in the housing 10 and opposite to the first scanning module 40, scans a back side PB of the document P fed across the scan region 22. The second scanning module 70 similar to the first scanning module 40 includes a second image sensor 71, a second lens 72, a plurality of second reflecting mirrors 73A to 73C, and a second light source 74. The second actuator 80 drives the second scanning module 70 to rotate. The second calibration sheet 66 is fixed in the housing 10 and disposed in the scan region 22. The second actuator 80 drives the second scanning module 70 to rotate such that the second image sensor 71 of the second scanning module 70 senses a plurality of scan lines on the second calibration sheet 66 to obtain a second calibration standard for calibrating a second image signal, which is obtained when the second scanning module 70 subsequently senses the back side PB of the document P. Each of the image sensors 41 and 71 may be a charge coupled device (CCD). It is to be noted that each of the first scanning module 40 and the second scanning module 70 may be a contact image sensor (CIS) scanning module.

In the drawings, the depicted first calibration sheet 60 has a level surface. In other embodiments, however, the first calibration sheet 60 may also have an arc shape so as to reduce the difference between the optical paths corresponding to the scan lines L1 and L2 of FIG. 3, and thus to obtain a better calibration effect.

Figure 4:
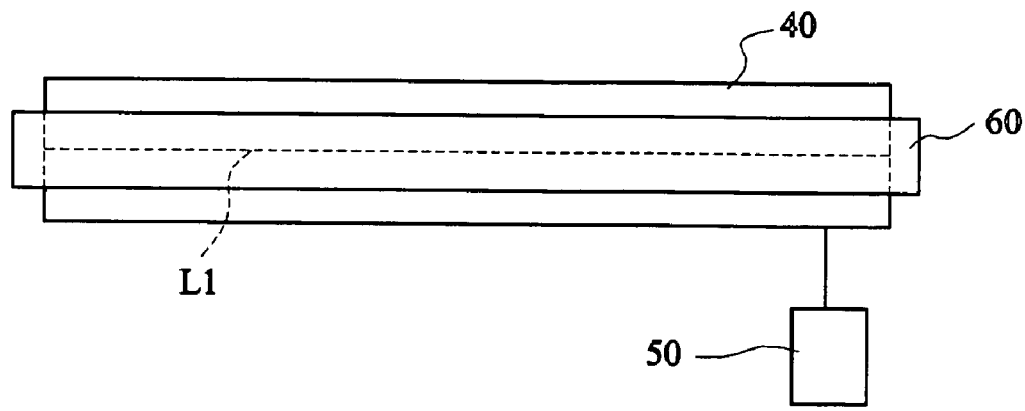
FIG. 4 shows a first state of a scanning module according to a second embodiment of the invention.
Figure 5:
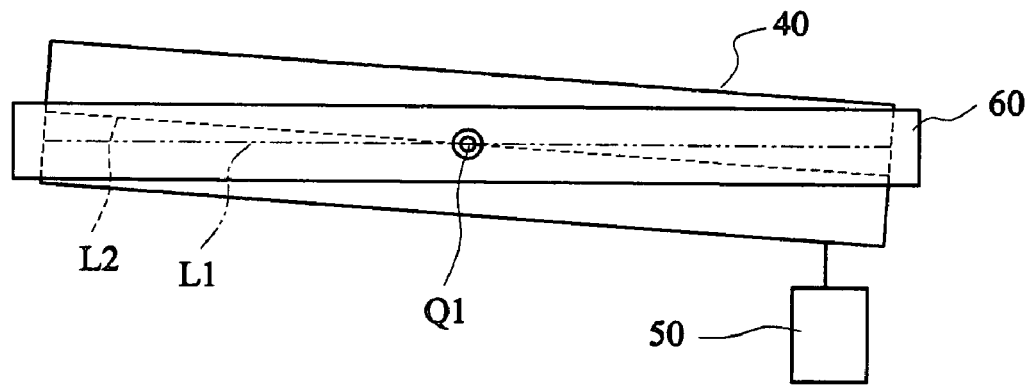
FIG. 5 shows a second state of the scanning module according to the second embodiment of the invention.
Figure 6:
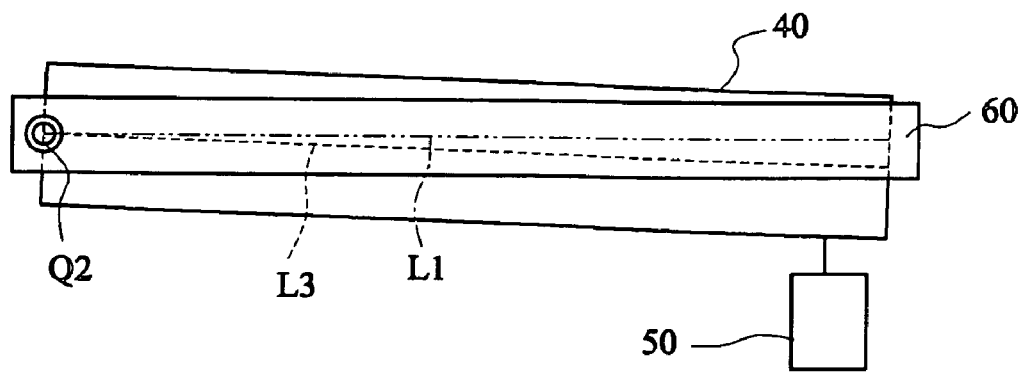
FIG. 6 shows a third state of the scanning module according to the second embodiment of the invention.

FIGS. 4 to 6 show first to third states of a scanning module according to a second embodiment of the invention. In this embodiment, as shown in FIGS. 4 to 6, the scan lines L1 and L2 are not parallel to each other. That is, the rotation axis about which the first actuator 50 drives the first scanning module 40 to rotate is orthogonal to the calibration sheet 60. Of course, the rotation axis may be located at point Q1 (FIG. 5), point Q2 (FIG. 6) or any other suitable position. In FIG. 5, the scan lines L1 and L2 intersect at the point Q1. In FIG. 6, the scan lines L1 and L3 intersect at the point Q2.

According to the embodiments of the invention, it is possible to implement a sheet-fed scanner capable of scanning multiple scan lines for image signal calibration. Using the cam, the piezoelectric material, or the bimetal material to achieve the minor rotation of the scanning module can effectively increase the number of scan lines, which are located on the calibration sheet and scanned by the scanning module. Thus, it is possible to avert the problem of the deviated calibration result caused by the contaminated calibration sheet.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A sheet-fed scanner, comprising:
a housing;
a sheet-feeding mechanism, which is disposed in the housing, for feeding a document across a scan region;
a first scanning module, which is rotatably mounted in the housing, for scanning a front side of the document fed across the scan region;
a first actuator for driving the first scanning module to move; and
a first calibration sheet fixed in the housing and disposed in the scan region, wherein the first actuator drives the first scanning module to move such that the first scanning module senses a plurality of scan lines of the first calibration sheet to obtain a first calibration standard for calibrating a first image signal obtained after the first scanning module subsequently senses the front side of the document, and the scan lines are not parallel to one another or to each other.

2. The scanner according to claim 1, wherein the first calibration sheet has a level surface.

3. The scanner according to claim 1, wherein the first calibration sheet has an arc shape.

4. The scanner according to claim 1, wherein the first actuator is composed of a power source and a cam.

5. The scanner according to claim 4, wherein the power source is a motor.

6. The scanner according to claim 1, wherein the first actuator is made of a piezoelectric material, which deforms to drive the first scanning module to rotate when a voltage is applied to the piezoelectric material.

7. The scanner according to claim 1, wherein the first actuator is made of a bimetal material, which deforms to drive the first scanning module to rotate when a voltage is applied to the bimetal material to generate a current flowing through the bimetal material.

8. The scanner according to claim 1, wherein the first scanning module comprises a first image sensor, a first lens, at least one first reflecting mirror and a first light source.

9. The scanner according to claim 1, wherein the first scanning module is a contact image sensor (CIS) scanning module.

10. The scanner according to claim 1, further comprising:
a second scanning module, which is rotatably mounted in the housing and opposite to the first scanning module, for scanning a back side of the document fed across the scan region;
a second actuator for driving the second scanning module to rotate; and
a second calibration sheet fixed in the housing and disposed in the scan region, wherein the second actuator drives the second scanning module to rotate such that the second scanning module senses a plurality of scan lines on the second calibration sheet to obtain a second calibration standard for calibrating a second image signal obtained after the second scanning module subsequently senses the back side of the document.

11. The scanner according to claim 10, wherein the second scanning module comprises a second image sensor, a second lens, at least one second reflecting mirror and a second light source.

12. The scanner according to claim 10, wherein the second scanning module is a contact image sensor (CIS) scanning module.

* * * * *